United States Patent [19]

Boyer

[11] Patent Number: 5,010,943

[45] Date of Patent: Apr. 30, 1991

[54] LIGHTWEIGHT INSULATING PARTITION

[76] Inventor: Gregory J. Boyer, 30122-50th La. S., Auburn, Wash. 98001

[21] Appl. No.: 295,654

[22] Filed: Jan. 10, 1989

[51] Int. Cl.$^5$ ............................................ A47G 5/00
[52] U.S. Cl. .................................... 160/351; 296/24.1
[58] Field of Search .......................... 160/351, 40, 135; 410/118, 122, 129, 87; 296/24.1; 62/258, 263, 265, 447

[56] References Cited

U.S. PATENT DOCUMENTS

| | | | |
|---|---|---|---|
| 1,704,758 | 3/1929 | Meinhardt | 296/24.1 X |
| 4,049,311 | 9/1977 | Dietrich et al. | 296/24.1 |
| 4,080,906 | 3/1978 | Brown | 296/24.1 X |
| 4,284,674 | 8/1981 | Sheptak | 52/307.9 X |
| 4,416,093 | 11/1983 | Salkeld et al. | 160/135 X |

FOREIGN PATENT DOCUMENTS

| | | | |
|---|---|---|---|
| 556197 | 4/1958 | Canada | 296/24.1 |
| 578060 | 6/1959 | Canada | 296/24.1 |
| 904584 | 8/1962 | United Kingdom | 296/24.1 |

Primary Examiner—Blair M. Johnson
Attorney, Agent, or Firm—Jensen & Puntigam

[57] ABSTRACT

A lightweight, flexible insulating partition for refrigerated trucks, trailers, containers and the like. Panels of polystyrene insulation are positioned in a rectangular frame of lightweight plastic members. The frame's top and side members are flexible, high density polyethylene U-channels opening inwardly to receive edges of the insulation. A heavier weight, solid base plate of ultra high molecular weight polyethylene strengthens the bottom edge of the partition against damage. Solid high density polyethylene ribs separate the polystyrene insulating panels. A resilient seal of urethane foam rubber encased in vinyl coated polyester seals the top and sides of the partition against the interior surfaces of the volume being partitioned. The frame and insulating panels are sandwiched between sheets of a flexible insulating material, and are sheathed in a hard protective skin covering each planar face of the partition. A bumper plate protects the bottom portion of each face of the partition, and a skid plate protects the partition's bottom edge beneath the base plate. Flexible handles allow the partition to be grasped and moved from either side.

An alternative embodiment comprises two interfitting partitions, the second partition receiving the seal along one side edge of the first partition.

4 Claims, 4 Drawing Sheets

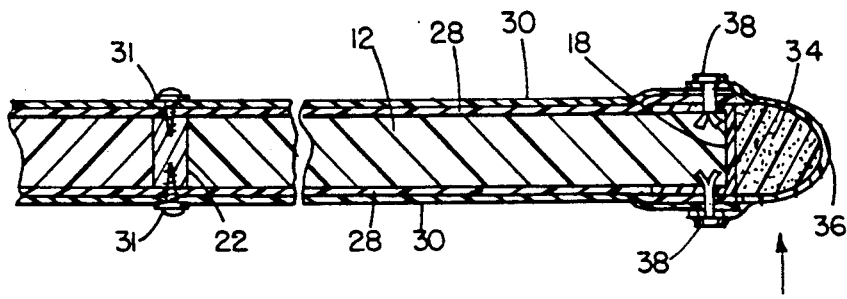
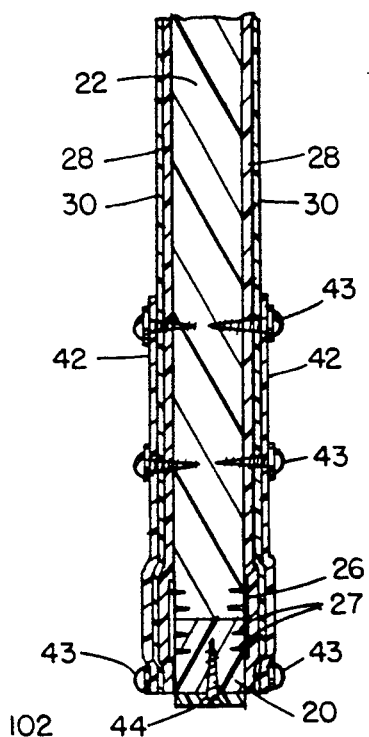
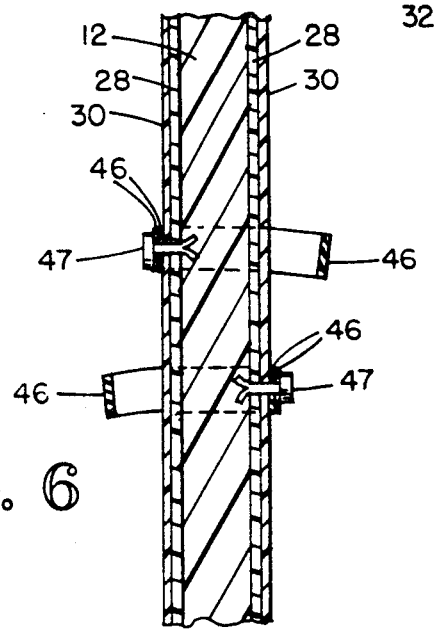
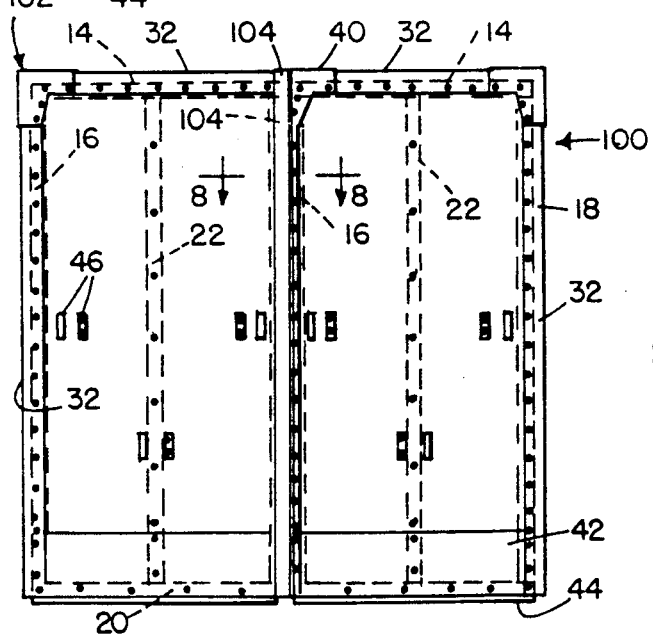
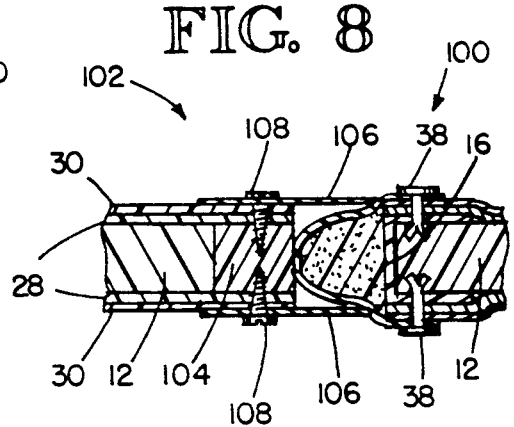

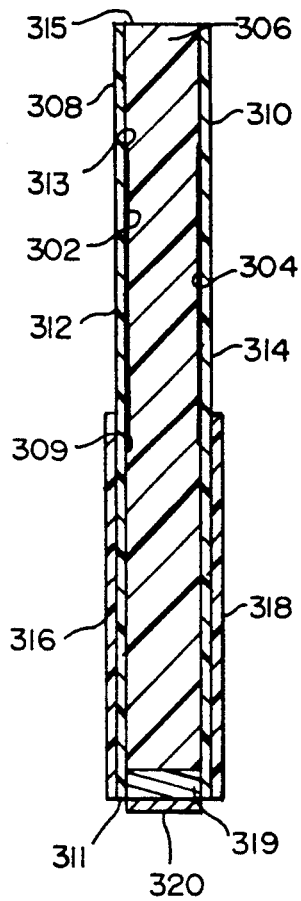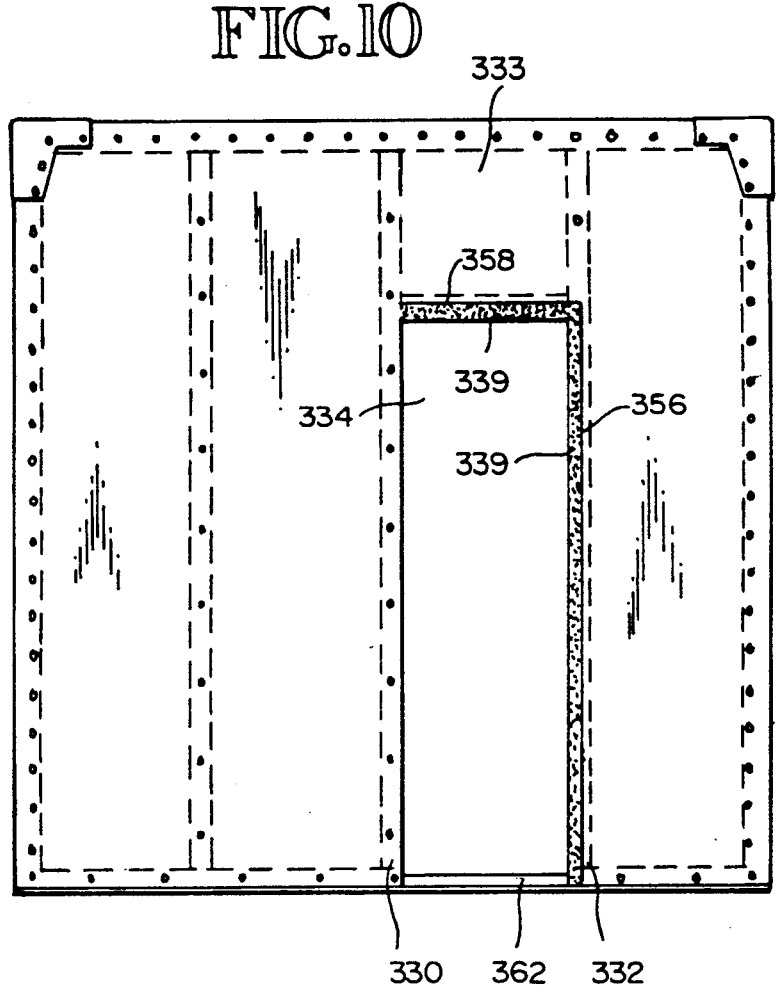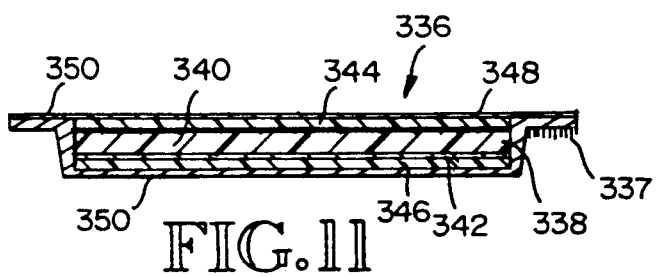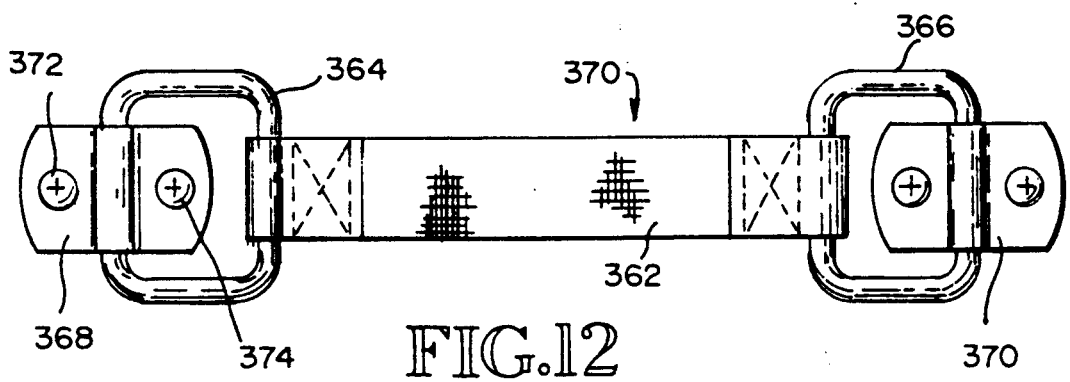

LIGHTWEIGHT INSULATING PARTITION

DESCRIPTION

1. Technical Field

This invention relates to partitions, and more particularly to insulating partitions such as may be used to divide an enclosed volume into separate subvolumes thermally insulated from each other.

2. Background Art

This is a continuation-in-part of U.S. Pat. application Ser. No. 105,716, now abandoned filed on 6 October 1987, titled Lightweight Insulating Partition, in the name of Gregory J. Boyer.

Refrigerated trucks, containers, and railroad cars are used extensively to transport perishable goods. It is often desirable to simultaneously transport or store in a single enclosed volume goods which must be maintained separately at different temperatures. For example, a single refrigerated truck trailer may be used to transport frozen foods, fresh produce and meat, and dry goods from a warehouse to a grocery store or supermarket.

Insulating partitions or bulkheads may also be used to temporarily enclose volumes which must be isolated from their outside environments. For example, indoor plants being transported in a truck during the winter can easily be damaged if the truck's doors are left open to the cold outside air, such as when the truck is being backed up to a loading dock. A lightweight, readily maneuvered partition would allow the truck's interior to be temporarily enclosed while the truck's doors were open.

The prior art offers several insulating bulkheads or partitions. Insulating bulkheads in common use today typically comprise an insulating material supported within heavy-duty wooden or metal framing members. These bulkheads suffer from several significant disadvantages. Their frames are extremely heavy, so that a wooden or metal insulating bulkhead for a refrigerated truck trailer may weigh over 200 pounds. Such weight cannot be safely maneuvered by an individual, requiring instead the use of a forklift or similar vehicle to install and remove the bulkhead.

A second disadvantage of conventional, heavy insulating bulkheads is that wooden frame members readily absorb moisture from the air within a refrigerated volume, and their metal frame members readily condense moisture. If the frame members are exposed around the perimeter of the bulkhead, as is typically the case, such moisture can freeze the bulkhead to the cold interior surfaces of the volume. When the partition is to be removed, great force is required to break the bulkhead free.

The third major disadvantage of wooden or metal insulating bulkheads is their susceptibility to being damaged by the forklifts used to move the bulkheads and to load and unload the goods. The pointed ends of a forklift's tines, extending beyond the far edge of a conventional pallet, can readily damage the frame members around the bulkhead, particularly along its bottom edge, and can puncture the insulation within the bulkhead. If plywood or other sheathing is added to the bulkhead to protect the insulation, the already heavy weight of the bulkhead is further increased.

Rigid bulkheads or partitions which have stiff wooden or metal frames which have little or no flexibility are easily knocked out of position when hit by moving forklifts and the like.

DISCLOSURE OF INVENTION

The present invention resides in a partition comprising insulation, a substantially flexible frame, a resilient seal around the frame, a substantially flexible protective skin, and a lower bumper plate on each face of the partition. The frame includes a top member, opposed side members, and a base member. The seal extends along the frame's top and side members and outwardly from those members. Each of the protective skins covers one of the opposed planar faces of the insulation, and each of the bumper plates partially covers one of said skins adjacent the bottom edge of the insulation.

BRIEF DESCRIPTION OF THE DRAWINGS

FIG. 4 is a partial horizontal cross-sectional view taken along line 4—4 of FIG. 2, showing the seal.

FIG. 5 is a partial vertical cross-sectional view along line 5—5 of FIG. 2, showing the base member, the bumper plates and one of the ribs.

FIG. 6 is a partial vertical cross-sectional view taken along the, line 6—6 of FIG. 2, showing the handles.

FIG. 7 is a front elevational view of an alternative embodiment of this invention having two interfitting partitions.

FIG. 8 is partial horizontal cross-sectional view taken along the line 8—8 of FIG. 7, showing the interfitting seal and side channel of the partitions.

FIG. 9 is a vertical cross-sectional view of another embodiment of the partition of the present invention.

FIG. 10 is an elevational view of a further embodiment of the partition of the present invention, incorporating a door therein.

FIG. 11 is a horizontal cross-sectional view of the door portion of the embodiment of FIG. 10.

FIG. 12 is an elevational view showing an alternative handle construction.

BEST MODE FOR CARRYING OUT THE INVENTION

Figure 1:
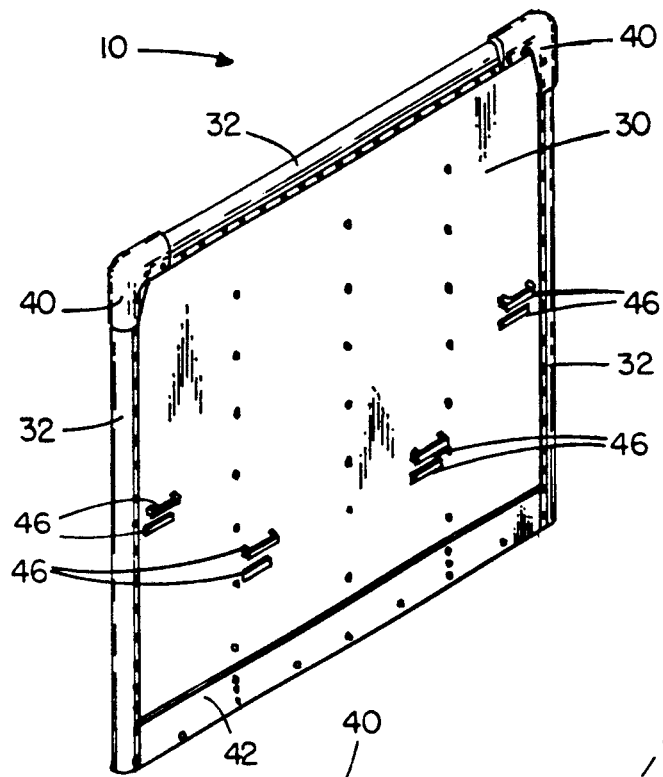
FIG. 1 is an isometric view of a partition according to one embodiment of this invention.
Figure 2:
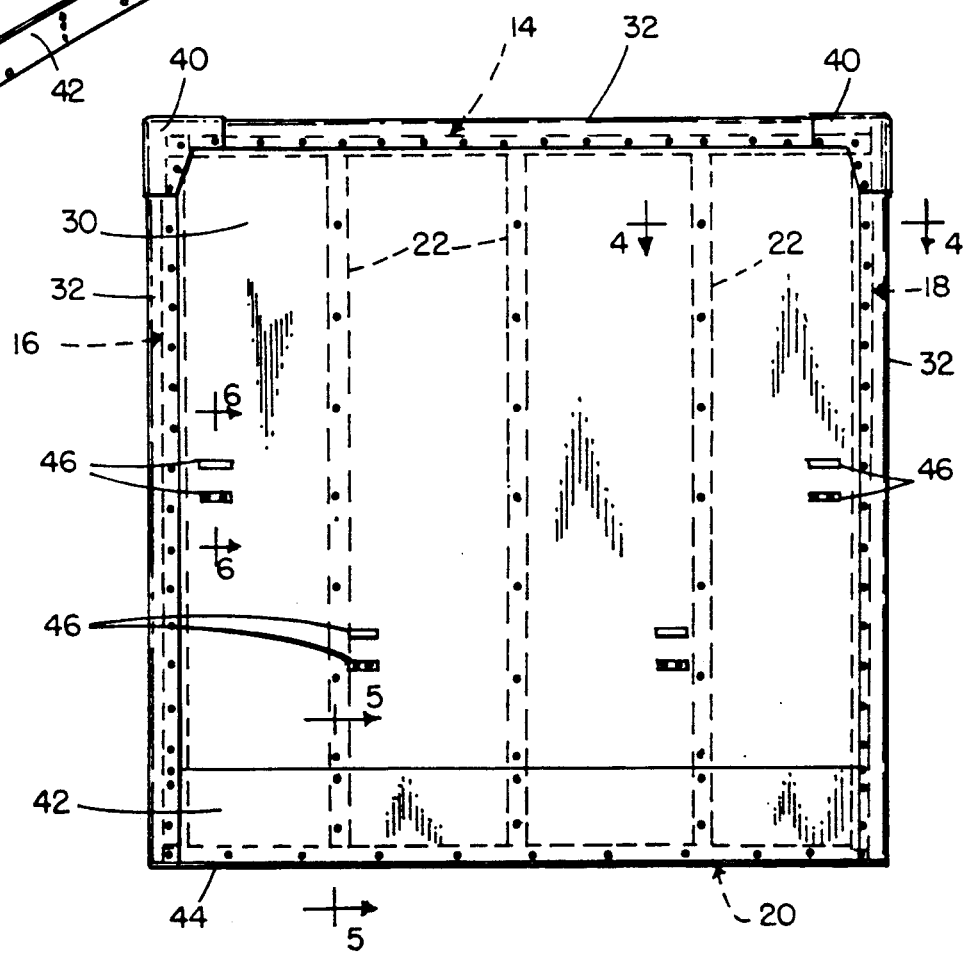
FIG. 2 is a front elevational view of the partition of FIG. 1.

As seen in FIGS. 1 and 2, a partition 10 according to the preferred embodiment of this invention is substantially flat and rectangular. The partition 10 is sized as required to snugly span between the interior surfaces of the enclosed volume to be partitioned. The partition 10 comprises a substantially flexible frame around panels of semirigid polystyrene insulation 12, all sandwiched between sheets of structural insulation 28, and sheathed in a substantially flexible protective skin 30. A resilient seal 32 extends outwardly from the top and side edges of the partition 10. Bumper plates 42 along the bottom portions of the partition's planar faces protect the partition from damage from forklift tines and the like. The partition 10 is constructed entirely from lightweight, flexible plastic materials, and includes handles 46 so that it may be readily moved by a single person grasping the handles 46 of the partition.

Figure 3:
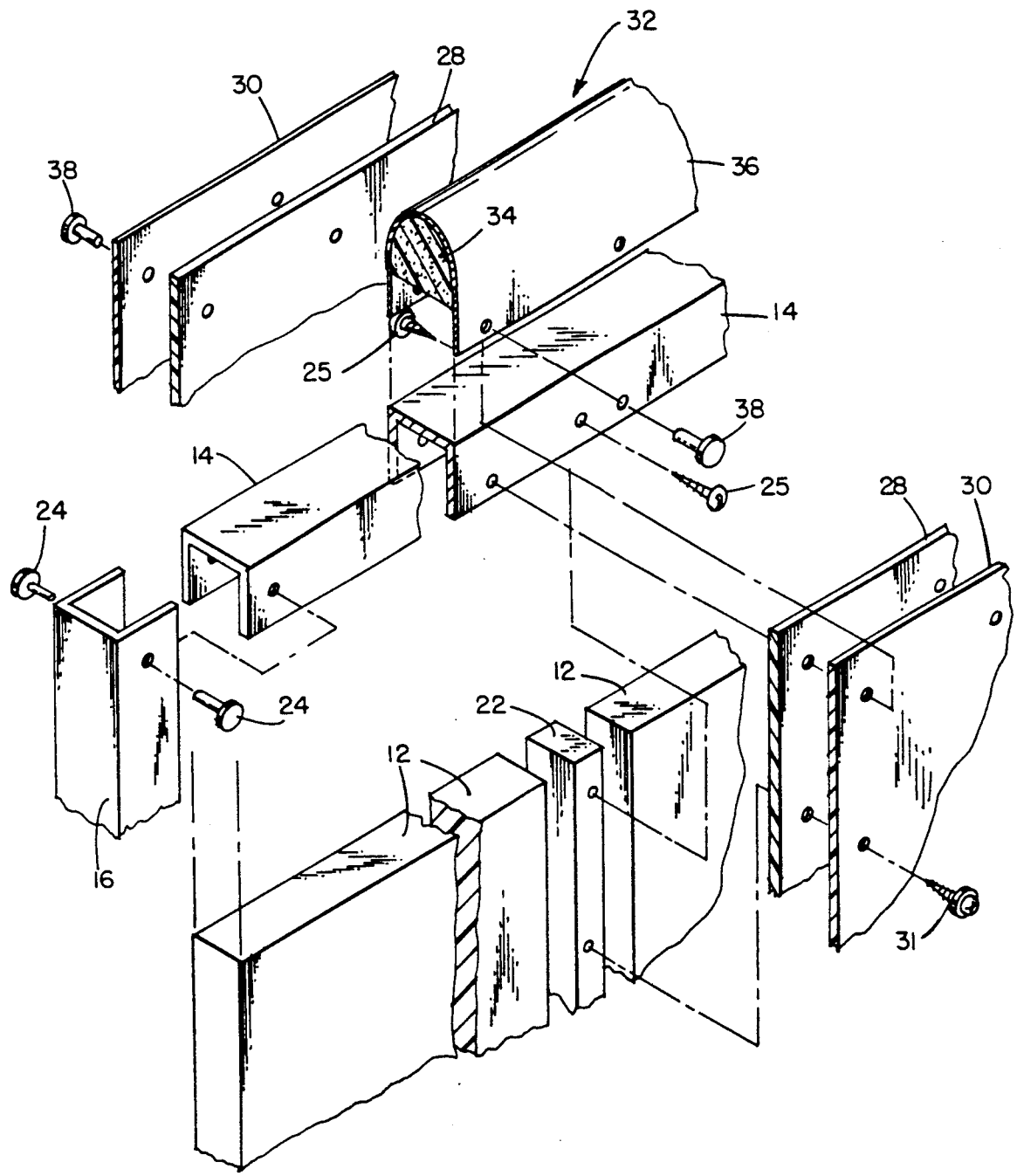
FIG. 3 is a partial exploded isometric cross-sectional view of the upper left hand corner of the partition of FIGS. 1 and 2.

As seen in FIGS. 2 and 3, the frame supports the insulation 12 and strengthens and rigidifies the partition 10. The frame comprises a top member 14, first and second side members 16, 18, a base plate 20, and interior ribs 22. The top and side members 14, 16, 18 of the frame are U-shaped channels oriented to open inwardly toward the interior of the partition 10. The side members 16, 18 are respectively attached at their top and bottom ends to opposite ends of the horizontal top member 14 and the base plate 20, creating the periphery of the rectangular frame. The side walls of the U-shaped top member 14 at its ends overlap the adjoining side walls of the U-shaped side members 16, 18 at their top ends, such as by bending the side walls of the top member toward each other and fitting them within the side walls of the side members. Adjoining side walls of the side members 16, 18 and the top member 14 are attached by nylon drive rivets 24.

The ribs 22 extend vertically between the top member 14 and the base plate 20, parallel to the side members 16, 18. The three ribs 22 are spaced equally between the side members 16, 18, thereby dividing the interior of the partition 10 vertically into four substantially equal spaces. The four panels of insulation 12 are placed in these spaces, each vertical side edge of each insulating panel 12 abutting one of the ribs 22 or the first or second side member 16, 18. The top ends of the ribs 22 are received within the inwardly opening top member 14. Conventional truss head sheet metal screws 25 extend through the side walls of the top member 14 into the upper ends of the ribs 22, securely attaching the ribs to the top member.

The present invention provides a flexible, lightweight, yet durable insulating partition by extensive use of modern lightweight plastics. In particular, the frame's top member 14, side members 16, 18, and ribs 22 are formed from high density polyethylene, which provides superior strength per unit weight, does not absorb moisture, and insulates against heat transfer. The substantially flexible insulation 12 and frame produce a partition 10 which can absorb significant impacts without deforming or breaking. This flexibility gives the partition of this invention an advantage over heavier bulkheads which have rigid wooden or metal frames, and which are more easily damaged by impacts. The rivets 24 attaching the top member 14 to the side members 16, 18 are nylon drive rivets, which combine lightweight strength with superior thermal insulating qualities.

The base plate 20, which is more likely to be damaged than the top member 14 or side members 16, 18, is a solid member of rectangular cross-section formed from ultra high molecular weight polyethylene. The bottom ends of the side members 16, 18 receive and are adhesively attached to the base plate 20. The side members 16, 18 are riveted to the base plate 20 after the seal 32 is put in place.

As best seen in FIG. 5, the bottom ends of the solid ribs 22 abut the top surface of the base plate 20, and are attached thereto by flat rectangular metal mending plates 26. The upper portion of each mending plate 26 overlaps and is attached to the bottom end portion of the side surface of its respective rib 22 by conventional flathead screws 27. The lower portion of each mending plate 26 overlaps and is attached to a side surface of the base plate 20 by additional flathead screws 27.

As seen in FIGS. 2 and 3, the partition 10 includes four panels of semi-rigid insulation 12 supported and surrounded by a frame. The insulation 12 is 1½ inches thick, extruded, closed-cell polystyrene, formed into elongated panels of equal length. Extruded polystyrene is used because it is substantially flexible, holds its shape even after significant bending, does not absorb moisture and is readily fabricated.

The frame and the panels of insulation 12 are sandwiched between two insulating sheets which further insulate the partition 10. The insulating sheets 28 are semi-rigid yet flexible, 3 mm thick sheets of a structural insulating material which is sold in the United States under the trademark (COROPLAST). Each insulating sheet 28 completely covers one of the vertical planar faces of the partition 10, extending to the top, side and bottom edges of the partition. The insulating sheets 28 are adhesively attached to the panels of insulation 12 by a synthetic rubber resin adhesive such as Strip Adhesive No. 1795 manufactured by DRG Qwik Stik Products, Madison, WI, which is specifically formulated to adhere to polyethylenes.

Two sheets of protective skin 30 in turn sheath the partition 10 to protect it from damage. Each of the protective skins 30 is placed against the outer surface of one of the insulating sheets 28. The protective skins 30 are strong, durable sheets of 0.40 inch thick acrylonitrile-butadiene-styrene, commonly known in the United States as "ABS". The protective skins 30 are adhesively attached to the insulating sheets 28 by a synthetic rubber resin adhesive. Each protective skin 30 and its adjoining insulating sheet 28 are attached to and held against the ribs 22 by conventional truss head sheet metal screws 31 with separate fender washers.

As seen in FIGS. 2, 3 and 4, a resilient seal 32 seals the partition against the interior surfaces of the enclosed volume being partitioned. The seal 32 is attached along the top member 14 and the side members 16, 18 of the frame, and extends outwardly therefrom in the plane of the partition 10. The seal 32 comprises a resilient core 34 and a flexible covering 36 over the core. The core 34 is urethane foam rubber, adhesively attached along one side to the outer surfaces of the top member 14 and the side members 16, 18, i.e. along the top and side edges of the partition 10.

The seal covering 36 is 18 ounce, vinyl coated polyester wrapped around the resilient core 34. The seal covering 36 extends beyond the core 34 to cover the top and side edge portions of the protective skins 30, and is adhesively attached thereto by the synthetic rubber resin-type adhesive described above. A bead of synthetic rubber adhesive and sealant is run along the edge of the seal covering 36 to adhere and seal it to the protective skin. The seal covering 36 is also riveted through the skins 30 and insulating sheets 28 to the side walls of the top and side members 14, 16, 18 by nylon drive rivets 38. The nylon rivets 38 attaching the seal covering 36 to the top and side members 14, 16, 18 thus also attach the top and side edges of the insulating sheets 28 and the protective skins 30 to the top and side members 14, 16, 18.

The seal 32 is reinforced at its top corners, where it is subject to greater wear, by corner boots 40 of the same vinyl coated polyester material as the seal covering 36. The L-shaped corner boots 40 are wrapped around the seal covering 36 at the top corners of the partition 10 after the seal covering 36 is adhered to the top and side members 14, 16, 18, but before it is riveted thereto. The rivets 38 at the top corners of the partition 10 therefore extend first through the corner boot 40, and then through the seal covering 36, the protective skin 30, the insulating sheet 28, and the side wall of one of the top or side members 14, 16, 18.

Referring now to FIGS. 2 and 5, the bottom portion of the partition 10 is protected against damage from forklift tines and the like by bumper plates 42 along the bottom portion of the vertical faces of the partition. Each bumper plate 42 is a rectangular sheet of ⅛ inch thick high density polyethylene, the same material as the top and side members 14, 16, 18 and the ribs 22. The bumper plates 42 extend horizontally across the entire width of the partition 10, and vertically about 12 inches upwardly from the bottom edge of the partition. The bumper plates 42 are adhesively attached to their adjoining protective skins 30 by synthetic rubber resin adhesive. Each bumper plate 42 is further attached through said protective skin 30 and the adjacent insulating sheet 28 to the solid base plate 20 and the solid ribs 22 by conventional sheet metal screws 43. The additional weight provided at the bottom of the partition 10 by the solid base plate 20 and the bumper plates 42 lower the partition's center of gravity, and thereby make the partition easier to handle.

A skid plate 44 along the bottom edge of the partition 10 elevates the partition slightly above the bottom surface of the enclosed volume to be partitioned, thereby further protecting the bottom of the partition from damage. The skid plate 44 is a narrow strip of ¼ inch high density polyethylene attached to the bottom surface of the base plate 20 by the same synthetic rubber resin adhesive, and by countersunk, conventional flat head screws 45.

The partition 10 is provided with handles 46 allowing it to be moved by a single individual without the assistance of a forklift. The handles 46 are provided on both vertical faces of the partition 10 so that it may be grasped and moved from either side. To prevent heat transfer through the partition 10, and for the comfort of the person handling the partition, the handles 46 comprise strips of flexible insulating material such as polypropylene webbing.

As seen in FIG. 6, each handle 46 is affixed to one vertical face of the partition 10, and extends through the partition to form a loop spaced outwardly from the opposite face of the partition. The ends of each flexible handle 46 are overlapped with each other, adhesively attached to each other and to the protective skin 30 by hot glue, and riveted to each other and through the protective skin 30 and the flexible insulating sheet 28 by nylon drive rivets 47. The flexible handles 46 extend through slots in the insulation 12, the flexible insulating sheets 28 and the protective skins 30. Synthetic rubber adhesive and sealant is used to seal the slots through which each handle 46 passes through the partition 10.

The method of use of the partition 10 described above is simple and straightforward. To install the partition 10, an individual grasps the handles 46 and lifts and carries the partition into the enclosed volume to be partitioned. Placing the partition 10 on the floor of the volume, the individual raises the partition until the seal 32 along the top member 14 engages the upper interior surface of the volume, and straightens the partition 10 until it extends perpendicularly across the volume with the seals 32 along the first and second side members 16, 18 engaging the interior side surfaces of the volume. Removal of the partition 10 is accomplished by reversing the steps for installation thereof.

It will be seen that the partition 10 is capable of flexing upon impact and returning to its original shape. Because the seal 32 firmly engages the interior surfaces of the enclosed volume, the partition is less likely to be pushed out of position than more rigid bulkheads which cannot flex under impact. It will be further seen that the partition 10 is essentially moisture proof, being constructed of plastics and metals which do not absorb or transmit moisture.

Additional features and options may be added to the partition 10 as required. For example, temperature controlling fans and adjustable vents opening through the partition can be added to allow a single refrigeration unit in one sub-volume to cool the adjacent sub-volume.

It will be understood that the flexible insulating sheet 28 may be omitted without endangering the structural integrity of the partition 10. It will also be understood that the solid base plate 20 and ribs 22 described above might be replaced by a base member and rib members having different cross-sections or other structural characteristics. For example, a base member and rib members might be provided from the same high density polyethylene U-shaped channel used for the top and side members 14, 16, 18. Finally, it will be understood that the strength provided by the ribs 22 may be provided instead by bonding relatively stronger insulation directly to the insulating sheets 28, and bonding those sheets to the protective skin 30, thereby creating an integral sandwiched construction.

An alternative embodiment of this invention is shown in FIGS. 7 and 8. In this embodiment, two interfitting partitions are used to partition the enclosed volume. Each partition of the alternative embodiment is constructed substantially the same as the partition 10 of the preferred embodiment described above, with certain exceptions as follows.

The alternative embodiment comprises interfitting first and second partitions 100, 102, each sized to extend halfway across the enclosed volume to be partitioned Each of the first and second partitions 100, 102 comprises extruded, closed-cell polystyrene insulation 12 formed into elongated rectangular panels. Each of the partitions 100, 102 also has a flexible frame including a U-shaped top member 14 and at least one U-shaped side member. The first partition 100 has U-shaped first and second side members 16, 18. The second partition has a U-shaped first side member 16, but a solid second side member 104 which is described in more detail below. The U-shaped members of the first and second partitions 100, 102 open inwardly to receive edges of the panels of insulation 12. A solid base plate 20 extends along the bottom edge of each partition 100, 102.

Flexible insulating sheets 28 and protective skins 30 cover each of the opposed vertical faces of each partition 100, 102. Bumper plates 42 and skid plates 44 protect the bottom portion of each partition 100, 102. Handles 46 provide easy handling and movement of the partitions.

A resilient seal 32 is attached along and extends outwardly from the top member 14 and both side members 16, 18 of the first partition 100, and from the top member 14 and the first side member 16 of the second partition 102. The seals 32 of the first and second partitions 100, 102 are constructed and attached as described above for the seal 32 of the preferred embodiment.

The first and second partitions 100, 102 of the alternative embodiment differ from the partition 10 of the preferred embodiment as follows. For a given sized enclosed volume to be partitioned, the first and second partitions 100, 102 are each only one-half the width of the preferred partition 10. The first and second partitions 100, 102 sealingly interfit with other along adjoining side edges to form an insulating partition across the full width of the enclosed volume.

As best seen in FIG. 8, the seal 32 of the first partition 100 along its first side edge extends outwardly therefrom toward the second partition 102, while the second partition 102 has a channel along its second side edge for receiving the seal 3 of the first partition 100. The channel of the second partition is formed by the surface of the solid second side member 104, and two spaced apart side strips 106 extending outwardly from the second side edge of the second partition 102 toward the first side edge of the first partition 100. The second side member 104 is a solid member of rectangular cross section, formed from high density polyethylene.

The side strips 106 respectively partially overlap the protective skins 30 along the side edge of the second partition 102 adjoining the first partition 100. The side strips 106 are adhesively attached to the second partition's skins, and are screwed into the solid second side member 104 by conventional sheet metal screws 108. The screws 108 attaching the side strips 106 to the solid second side member 104 thus also attach the protective skin 30 and the insulating sheet 28 to the solid second side member, much as the nylon rivets 38 into the U-shaped top and side members 14, 16, 18 attach both the seal covering 36 and the protective skins 30 and insulating sheets 28 thereto.

The resilient seal 32 along the first side edge of the first partition 100 is received and compressed within the channel formed between the spaced apart side strips 106 of the second partition 102 when both partitions are in place, producing a tight insulating seal between the partitions.

FIG. 9 shows another embodiment of the partition of the present invention. It differs from the embodiment of FIGS. 1-6 by a different core construction, although it does include several elements of the partition of FIGS. 1-6, including the top and side members and the base plate 14, 16, 18 and 20, ribs 22-22, insulation panels 12, and resilient side and top seal 32 and corner boots 40.

In the embodiment of FIG. 9, a sheet of 0.030 inches thick high density polyethylene plastic is secured by means of an adhesive to both front and rear surfaces of the panels of insulation 306 and the spaced vertical ribs 307. These sheets 302 and 304 extend the full width of the partition and are approximately 48 inches high. The lower edge 309 of each sheet (e.g. sheet 302) is approximately 36 inches from the lower end 311 of the partition. The upper edge 313 of each sheet typically extends to within 6-20 inches of the upper end 315 of the partition, depending upon the height of the partition. Sheets 302 and 304 provide additional rigidity to the middle and upper portions of the partition. The sheets 302 and 304 generally do not need to extend all the way to the top of the partition.

Layers of Coroplast 308 and 310 are then secured to the exposed portions of the foam 306 insulation and the vertical ribs 307, as well as layers 302 and 304. The Coroplast sheets 308 and 310 cover the entire front and rear surfaces of the partition. The next layers are sheets 312, 314 of a 19 ounce (approximately 4 mm thick) vinyl coated polyester which extend the entire width of the partition and from the upper end 315 of the partition downwardly a distance which is slightly greater than one-half of the total height of the partition, i.e. 60 inches, leaving approximately 30-45 inches of Coroplast exposed. The vinyl sheets 312, 314 form a high impact protective skin for the partition, to protect the partition against the rough handling typically encountered in actual use.

Bumper plates 316 and 318, respectively, are secured to the remaining exposed surface of the Coroplast sheets, overlapping to some extent the lower portion of vinyl sheets 312 and 314. The bumper plates are 0.125 inches thick high-density polyethylene and extend the full width of the partition, and from the lower end 311 of the partition upwardly approximately 48 inches, overlapping the lower portion of the vinyl sheets 312, 314 for 3-30 inches. The bumper plates 316 and 318 are secured to the lower portion of the partition in manner described above, e.g. by adhesives. The bumper plates 316 and 318 are also secured to the vertical ribs of the partition, by screws or the like.

Secured to the lower surface portions of base plate 319 are skid plates 320, similar in material to that described above for the embodiment of FIGS. 1-6. Skid plate 320 is secured to the base plate 319 by means of screws, etc., such that when the skid plate is worn, it can be conveniently removed and a new skid plate installed, similar to that for the embodiment of FIGS. 1-6.

It should be understood that the skid plate 320 comprises a material which does not freeze at the temperatures normally encountered in refrigeration trucks, and does not absorb moisture. It also is relatively slick. The skid plate 320 thus will not freeze to the sides and bed of the refrigerator truck and is quite easy to move or "slide" about within the truck. The use of a skid plate provides a significant advantage over existing partitions.

Extending along the sides and top of the partition of FIG. 9 is a tear-resistant pressure seal which mates with the sides and top of the refrigerator truck. The pressure seal (not shown in FIG. 9) is substantially identical to that shown and described above with respect to the embodiment of FIGS. 1-6. Since the pressure seal is subject to a high degree of wear, it should be understood that the seal may be conveniently replaced by removing the rivets and pulling away the seal from the outer surfaces of the frame members. The adhesive simply separates from the frame members, without the seal tearing. A new seal may then be installed by applying additional adhesive, laying the seal and reinstalling the rivets, as described above. Thus, the seal may be conveniently replaced when it is worn, without disassembly or other adverse effect on the remainder of the partition. This feature extends the life of the partition and is applicable to the partition of FIGS. 1-6 as disclosed.

Similarly, the embodiment of FIG. 9 as well as that of FIGS. 1-6 includes boot-like elements at the top corners of the partition. These elements are also subject to wear, and are secured to the partition by rivets and rubber adhesive. These elements are also replaceable by simply removing the rivets, pulling away the boots with the adhesive and replacing them.

It should be further understood that the configuration of element shown in FIG. 9 and described above can also be used in a double partition embodiment, such as shown in FIGS. 7-8.

FIGS. 10 and 11 show an additional feature of the present invention, specifically the provision of a door in the partition between two adjacent vertical ribs.

The partition shown in FIGS. 10 and 11 is substantially similar to that described above with respect to the embodiment of FIGS. 1-6 or the embodiment of FIG. 9. In FIG. 10, a portion of the partition is cut-out, between adjacent ribs 330 and 332. A remaining portion 333 of the partition between those ribs extends downwardly approximately 20-35 inches from the top of the partition, leaving an opening 334 for the door. The particular height of the door can be varied and is not critical. Also, one of the vertical ribs 330 or 332 may be moved laterally so as to increase the total width of the door, if necessary.

The door 336 itself is shown in cross-section in FIG. 11. It comprises a center sheet 338 of Coroplast, two facing sheets 340, 342 of 0.030 inch thick high density polyethylene, faced in turn by two further sheets 344, 346 of Coroplast and then finished by two sheets of 19 ounce 4 mm thick vinyl 348, 350. A bumper plate (not shown) may, if desired, be positioned on one or both surfaces of the door 336, extending upwardly from the lower end thereof to a line which is in the same plane as the top of the bumper plate of the remainder of the partition. However, such a bumper plate is not necessary.

The door 336 is swingably secured along one vertical edge to one of the ribs, i.e. center rib 330, by means of hinges 350. Along the other vertical edge and top of the door 336 are provided a plurality of Velcro hooks 337, which mate with matching Velcro loops 339 which are mounted on the exposed internal vertical edge and top 356, 358 of the opening 334. The hooks and loops mate together to provide a capability of securing the door in a closed position. Nylon web handles (not shown) are secured to the outer surface of both sides of the door. The threshold of the door, i.e. the base plate 362 of the partition, is beveled or mates with a ramp on both sides thereof to permit a hand truck to be conveniently moved through the doorway.

Another handle structure for the partition of the present invention is shown in FIG. 12. The handle 370 includes a length of 1" nylon webbing 362, the ends of which are secured to two 1½ inch steel rings 364 and 366. The D rings 364, 366 in turn are secured to the door by steel clips 368 and 370. Each clip, i.e. clip 368 includes two machine screws 372 and 374, which extend through the partition to mate with female joint connector nuts in the steel clips for a similar handle on the opposite surface of the partition. Hence, the two handles, in opposite sides of the partition, tend to provide a firm base of attachment for each other through the use of extended machine screws and connector nuts.

In a variation of the embodiment of FIG. 12, the D rings and the clips are eliminated and the ends of the nylon web are secured through the partition with machine screws and mating female joint connectors. 1½ inch fender washers are used between the head of the machine screws and the surface of the web.

It will be appreciated that, although specific embodiments of the invention have been described herein for purposes of illustration, various modifications may be made without departing from the scope and spirit of the invention. Accordingly, the scope of the invention is not limited except as by the following claims.

I claim:

1. A self-supporting partition for an enclosed volume, such as a refrigerated vehicle, the partition having front and back planar surfaces and a thickness dimension therebetween, comprising:

a frame which includes a top member, opposing side members and a base member;

at least one panel of insulation supported within said frame, wherein the frame and insulation are constructed and arranged such that the partition is capable of flexing under pressure;

a flexible member for sealing the frame to the interior boundaries of the refrigerated vehicle and for maintaining the partition in place within the vehicle, said flexible member extending along and outwardly from the frame's top and side members, wherein the flexible member has a width which is approximately as great as the thickness of said partition and a height which is approximately at least as great as said width, and wherein the flexible member is resilient and compressible, such that when the flexible member is compressed to permit the partition to fit upright within the vehicle, the partition is maintained in place solely by said flexible member, acting against the interior boundaries of the vehicle;

a flexible protective skin member covering at least a portion of opposed planar surfaces of the insulation;

a bumper plate of a rigid material which is substantially thicker than the protective skin member and resistant to puncture, extending across the partition and upwardly for a selected distance from the lower edge thereof, covering a portion of each skin member; and a rigid skin plate secured to the lower edge of the base member of the frame and in contact with the floor boundary of the vehicle when the partition is in place in the vehicle, said skid plate being of such a material that it does not adhere to the floor boundary of the refrigerated vehicle.

2. An article of claim 1, wherein the skid plate comprises a plastic material which is characterized by a freezing point which is substantially below the temperatures normally encountered within the refrigerated vehicle and a capability of not absorbing moisture, such that the skid plate will not adhere to the bed of the refrigerated vehicle, permitting ease of movement of the partition within the refrigerated vehicle, wherein the flexible member comprises a core of resilient material which is adhesively attached to the top and side members of the frame and a flexible covering surrounding the core, said covering being attached to said top and side members, the resilient core and the flexible cover being removably attached to the top and side members of the frame, wherein the frame includes at least three (3) rib members, with panels of insulation extending between the rib members and the frame, and wherein the apparature further includes thin sheets of relatively rigid material covering a middle portion of the exposed planar surfaces of the insulation and sheets of a flexible insulation material covering substantially the entire opposed surfaces of the combination of the insulation and the sheets of relatively rigid material, wherein the skin member overlies the sheets of flexible insulation material, the bumper plate overlying a lower portion of the flexible insulation material and a lower portion of the skin member.

3. An apparatus of claim 1, including handle means which comprise two strips of flexible material, wherein each of said strips, respectively is secured at the opposite ends thereof through the partition to an opposing handle on the opposite side of the partition.

4. A self-supporting combined partition for an enclosed volume, such as a refrigerated vehicle, comprising:
- first and second partitions each having a frame which includes a top member, opposing side members and a base member;
- at least one panel of insulation bounded by said frame, wherein the frame and insulation are constructed and arranged such that each partition is capable of flexing under pressure;
- flexible members positioned along the top and both side members of the frame of the first partition and along the top and one side member of the frame of the second partition for sealing the combined partition tot he interior boundaries of the refrigerated vehicle and supporting the combined partition within the vehicle, wherein the flexible members have a width which is approximately as great as that of the partition and a height approximately at least as great as said width, wherein the flexible members are resilient and compressible, such that when the flexible members are compressed so as to permit the first and second partitions to fit upright within the vehicle, the combined partition is maintained in place solely by said flexible members, acting against the interior boundaries of the vehicle;
- a flexible protective skin element covering at least a portion of the opposed planar surfaces of the insulation of each partition;
- a skid plate secured to the lower surface of the base member of the frame, said skid plate being of such a material that it does not adhere to the floor of the refrigerated vehicle; and
- a bumper plate covering a lower portion of each opposed planar surface of the insulation overlapping the protective skin element of each partition, wherein the second partition includes means along the other side member thereof for receiving the flexible member extending along the mating side edge of the first partition, wherein the first and second partitions, when positioned with the flexible member of the first partition in a receiving relationship with the second partition, results in a partition of the enclosed volume in a sealed and insulated manner.

* * * * *

UNITED STATES PATENT AND TRADEMARK OFFICE
CERTIFICATE OF CORRECTION

PATENT NO. : 5,010,943

DATED : April 30, 1991

INVENTOR(S) : Gregory J. Boyer

It is certified that error appears in the above-identified patent and that said Letters Patent is hereby corrected as shown below:

Column 10:

Claim 1, line 32, the word "skin" should be --skid--.

Claim 2, line 18, the word "apparature" should be --apparatus--.

Column 11:

Claim 4, line 15, the term "tot he" should be --to the--.

Signed and Sealed this

Sixth Day of October, 1992

Attest:

DOUGLAS B. COMER

Attesting Officer

Acting Commissioner of Patents and Trademarks